(12) United States Patent
Chen

(10) Patent No.: US 8,833,997 B2
(45) Date of Patent: Sep. 16, 2014

(54) LIGHT GUIDE BAR AND OPTICAL TOUCH PANEL HAVING THE SAME

(75) Inventor: Huang-Jen Chen, Taichung (TW)

(73) Assignee: Briview Corporation, Taoyuan (TW)

( * ) Notice: Subject to any disclaimer, the term of this patent is extended or adjusted under 35 U.S.C. 154(b) by 330 days.

(21) Appl. No.: 13/176,058

(22) Filed: Jul. 5, 2011

(65) Prior Publication Data

US 2012/0045171 A1  Feb. 23, 2012

(30) Foreign Application Priority Data

Aug. 18, 2010  (TW) .............................. 099127568 A

(51) Int. Cl.
*F21V 7/04* (2006.01)
*F21V 8/00* (2006.01)

(52) U.S. Cl.
CPC ............ *G02B 6/0038* (2013.01); *G02B 6/0068* (2013.01); *G02B 6/0036* (2013.01); *G02B 6/0075* (2013.01); *G02F 3/0421* (2013.01)
USPC ........... 362/606; 362/616; 362/617; 362/619; 362/620

(58) Field of Classification Search
USPC ................ 362/23.02, 23.09, 23.16, 606, 607, 362/615–620, 623–626; 345/173, 175; 178/18.03, 18.09, 18.11
See application file for complete search history.

(56) References Cited

U.S. PATENT DOCUMENTS

| | | | |
|---|---|---|---|
| 6,891,530 B2 | 5/2005 | Umemoto et al. | |
| 2005/0140835 A1* | 6/2005 | Maeda et al. | 349/28 |
| 2010/0253649 A1 | 10/2010 | Chen | |
| 2010/0315833 A1* | 12/2010 | Holman et al. | 362/607 |
| 2011/0050646 A1* | 3/2011 | Teng et al. | 345/175 |

FOREIGN PATENT DOCUMENTS

| | | |
|---|---|---|
| JP | 2002-313121 | 10/2002 |
| JP | 2003-280802 | 10/2004 |
| JP | 2007-026463 | 2/2007 |

(Continued)

OTHER PUBLICATIONS

English translation of abstract of TW 343817 (published Nov. 1, 2008).
Taiwan Office Action dated Apr. 29, 2013.
English translation of abstract of TW M376831, Jul. 5, 2011.

(Continued)

*Primary Examiner* — Thomas Sember
(74) *Attorney, Agent, or Firm* — McClure, Qualey & Rodack, LLP

(57) ABSTRACT

A light guide bar and an optical touch panel utilizing the light guide bar are provided. The light guide bar is applied to an optical touch panel with a sensing area. The light guide bar includes a bar body and a plurality of prisms. The bar body has a first receiving end, a light-exiting surface, and a structure surface. The light-exiting surface is opposite to the structure surface and faces the sensing area while the first receiving end is connected between an end of the light-exiting surface and an end of the structure surface. The prisms are formed on the structure surface. Each prism includes a first surface and a second surface respectively having a first angle and a second angle with respect to the structure surface, wherein the second surface is closer to the first receiving end than the first surface, and the second angle is larger than or equal to the first angle. The prisms are utilized to alter the angle of the light exiting the bar body to improve the touch-sensing effect of the optical touch panel utilizing the light guide bar.

12 Claims, 13 Drawing Sheets

(56) References Cited

FOREIGN PATENT DOCUMENTS

| | | |
|---|---|---|
| TW | M343817 | 11/2008 |
| TW | M371272 | 12/2009 |
| TW | M371274 | 12/2009 |
| TW | M376831 | 3/2010 |

OTHER PUBLICATIONS

English translation of abstract of TW M371274, Jul. 5, 2011.
English translation of abstract of JP 2003-280802, Mar. 24, 2013.
English translation of abstract of JP 2007-026463, Mar. 24, 2013.
English translation of abstract of JP 2002-313121, Mar. 24, 2013.

* cited by examiner

LIGHT GUIDE BAR AND OPTICAL TOUCH PANEL HAVING THE SAME

BACKGROUND OF THE INVENTION

1. Field of the Invention

The invention generally relates to a light guide bar and an optical touch panel utilizing the light guide bar; particularly, the present invention relates to a light guide bar that has a plurality of prisms for changing the angle of an exiting light to increase brightness and uniformity so as to improve the touch-sensing effect of the optical touch panel utilizing the light guide bar.

2. Description of the Prior Art

Due to the characteristics of easy-to-operate, the touch display panel is widely used as the operating interface of computer information system including booking system and register system in many public places like railway stations, post offices, and hospitals. According to the sensing principle, the touch display panels may be classified into the following types: resistive, capacitive, and optical. The resistive or capacitive display panel, however, must use a plurality of resistors or capacitors, but the transmission rate of light is limited by the physical character of the device. Compared with the resistive or capacitive display panel, under the trend of large touch display panel, the optical touch display panel has natural superiority.

FIG. 1A is a schematic view of the known optical touch panel. As shown in FIG. 1A, the optical touch panel generally includes an infrared light-emitting diode 1, a light guide bar 2, a sensor 3 and other components. Infrared light is generated by the infrared light-emitting diode 1 and is guided to a sensing area 4 through the light guide bar 2, and the sensor 3 senses the infrared light over the sensing area 4. The sensor 3 will sense the variation of infrared energy over the sensing area 4 and will further determine the touch coordinates when a user touches the sensing area 4. The sensing of the sensor 3 is influenced by the infrared light over the sensing area 4. In order to improve the sensing result, microstructures are formed on a structure surface 6 opposite to a light-exiting surface 5 of the infrared light.

General microstructure is formed by methods like the printing. However, the microstructure formed by the methods like the printing only improves the brightness of the infrared light emitted from the light guide bar 2, and the microstructure contributes less to the uniformity. FIG. 1B is a schematic view of the brightness performance of the known optical touch panel. As shown in FIG. 1B, the general microstructure applies the distribution of infrared energy (or the brightness) to concentrate on the viewing angle between −70° and −80° (the viewing angle herein is from the normal of the light-exiting surface 5), and this non-uniform energy distribution will cause the sensor 3 to sense erroneously or lose efficacy.

SUMMARY OF THE INVENTION

One object of the present invention is to provide a light guide bar and an optical touch panel utilizing the light guide bar. The optical touch panel can improve the brightness and the uniformity of light from the light guide bar in comparison with the prior art, further improving the touch-sensing effect of the optical touch panel utilizing the light guide bar.

The light guide bar is utilized in the optical touch panel having a sensing area, wherein the light guide bar includes a bar body and a plurality of prisms. The bar body includes a first receiving end, a light-exiting surface, and a structure surface, wherein the light-exiting surface is opposite to the structure surface and faces the sensing area, and the first receiving end is connected between an end of the light-exiting surface and an end of the structure surface. The prisms are formed on the structure surface and have a first surface and a second surface, wherein the first surface and the second surface have a first angle and a second angle with respect to the structure surface, respectively. The second surface is closer to the light receiving end than the first surface, and the first angle is not less than the second angle. The present invention utilizes the prisms to alter the angle of the light which exits from the bar body and to increase the brightness and the uniformity, further improving the touch-sensing effect of the optical touch panel with the light guide bar.

DETAILED DESCRIPTION OF THE PREFERRED EMBODIMENT

A light guide bar and an optical touch panel utilizing the light guide bar are provided. In a preferred embodiment, the light guide bar can be used in the optical touch panel, and the optical touch panel can be used with a flat display panel.

Figure 1A:
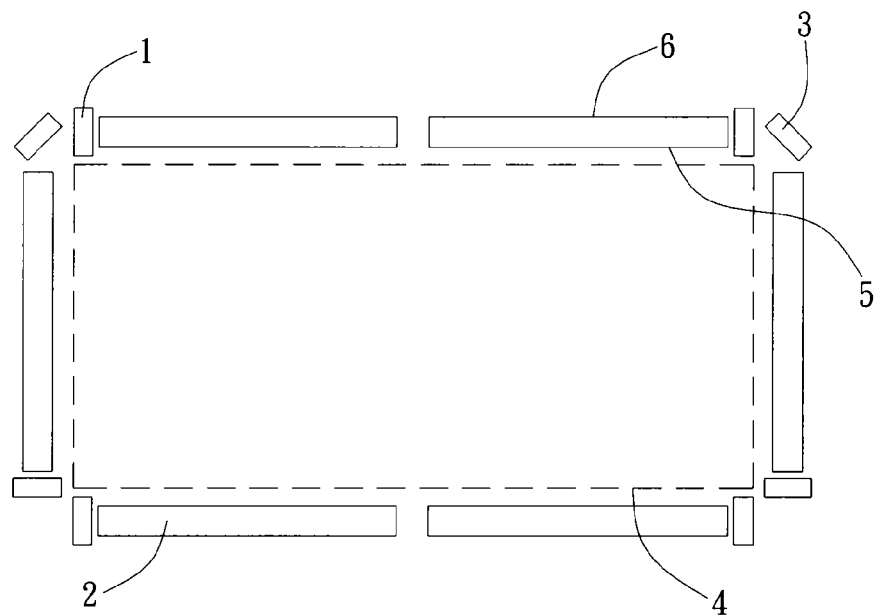
FIG. 1A is a schematic view of the known optical touch panel.
Figure 1B:
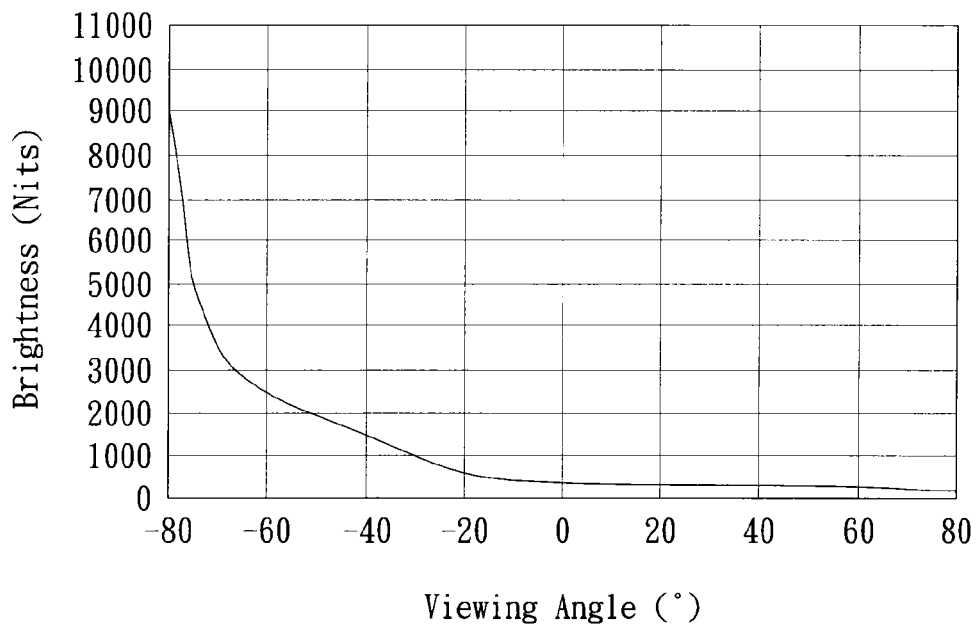
FIG. 1B is a schematic view of the brightness performance of the known optical touch panel.
Figure 2A:
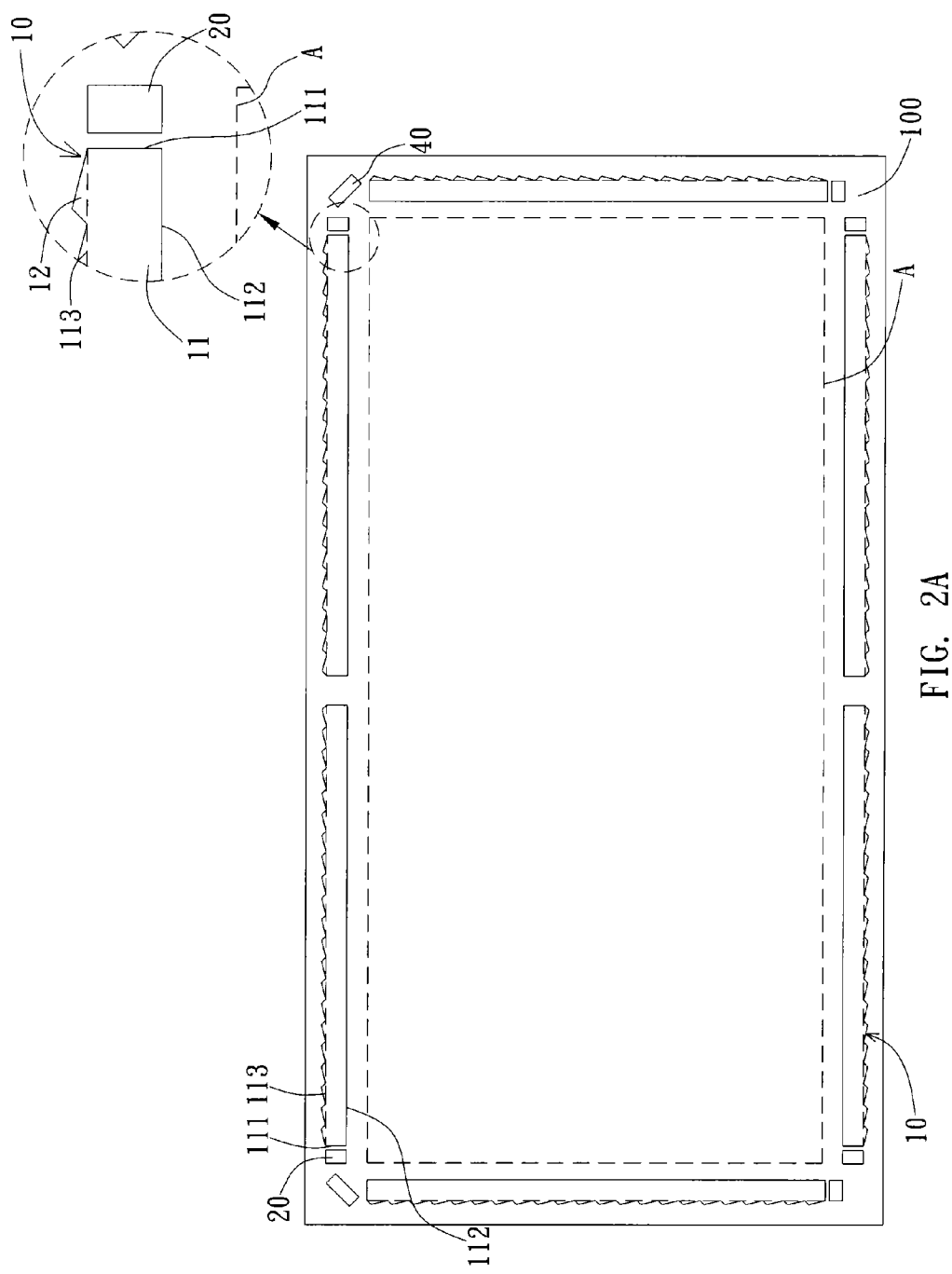
FIG. 2A is a schematic view of an embodiment of the light guide bar and the optical touch panel utilizing the light guide bar of the present invention.
Figure 2B:
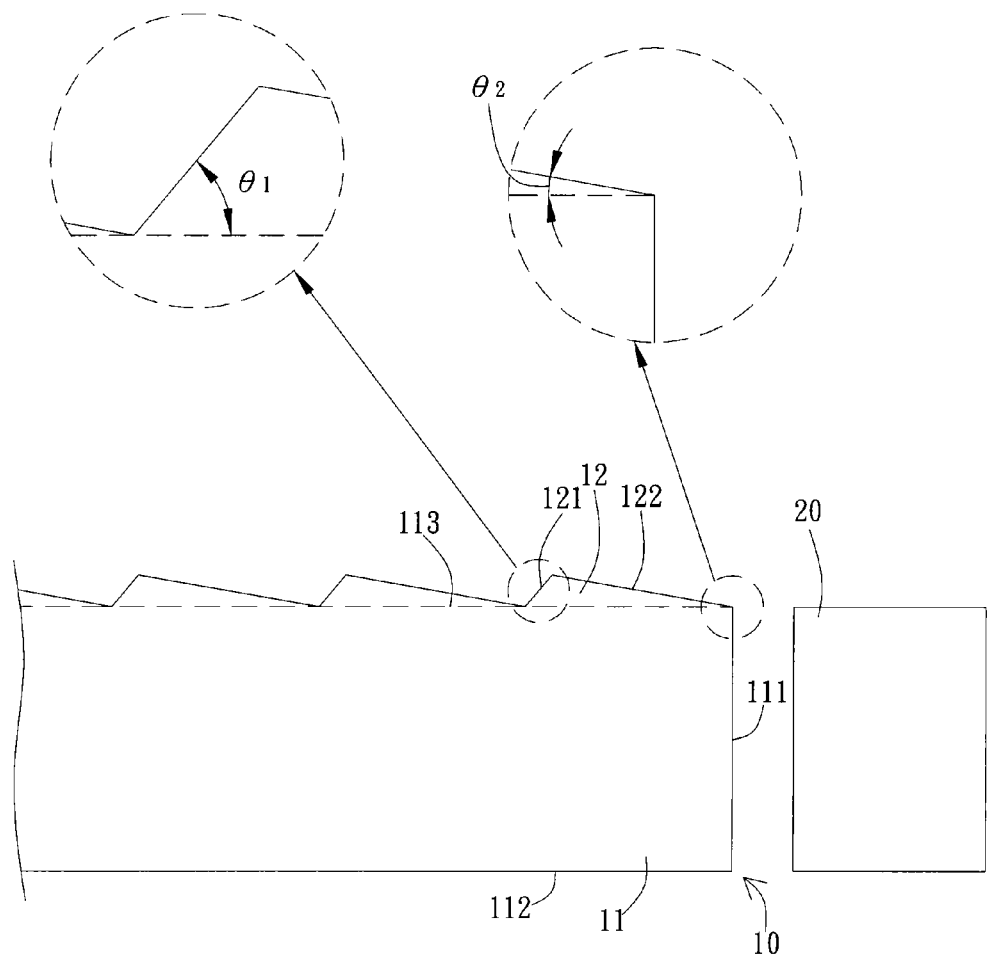
FIG. 2B is a top view of the light guide bar of FIG. 2A

The light guide bar is utilized in the optical touch panel having a sensing area. FIG. 2A is a schematic view of an embodiment of the light guide bar and the optical touch panel utilizing the light guide bar of the present invention; FIG. 2B is a top view of the light guide bar shown in FIG. 2A. As shown in FIG. 2A and FIG. 2B, the light guide bar 10 is disposed on one side of the sensing area A of the optical touch panel, wherein the light guide bar 10 includes a bar body 11 and a plurality of prisms 12. The bar body 11 includes a first receiving end 111, a light-exiting surface 112, and a structure surface 113. The light-exiting surface 112 faces the sensing area A opposite to the structure surface 113. The first receiving end 111 is a sidewall on an end of the bar body 11 and is connected between an end of the light-exiting surface 112 and an end of the structure surface 113. Light generated from the light source 20 enters the light guide bar 10 from the first receiving end 111.

The structure surface 113 is adjacent to the first receiving end 111 and opposite to the light-exiting surface 112. The structure surface 113 faces the direction opposite to the light-exiting surface 112, and the prisms 12 are formed on the structure surface 113. In other words, the prisms 12 are disposed on the structure surface 113 that neighbors with the first receiving end 111 and is opposite to the sensing area A, so that light enters from the first receiving end 111 and is reflected by the prisms 12 and exits toward the direction of the sensing area A. Each prism 12 includes a first surface 121 and a second surface 122. The first surface 121 and the second surface 122 have a first angle θ1 and a second angle θ2 with respect to the structure surface 113, respectively. The second surface 122 is closer to the first receiving end 111 than the first surface 121. In detail, the second surface 122 forms an angle less than 90° with the outward normal direction to the first receiving end 111 so that the second surface 122 faces to a direction same as the outward normal direction to the first receiving end 111. The first surface 121 forms an angle large than 90° with the outward normal direction to the first receiving end 111 so that the first surface 121 faces a direction opposite to the outward normal direction to the first receiving end 111. As such, the second surface 122 is closer to the first receiving end 111 than the first surface 121. The first angle θ1 is larger than or equal to the second angle θ2. In the embodiment, the first angle θ1 is larger than the second angle θ2, wherein the first angle θ1 is preferably between 10° and 55°, and the second angle θ2 is preferably between 3° and 10°. In other embodiments, however, the first angle θ1 and the second angle θ2 can be adjusted so that the first angle θ1 is equal to the second angle θ2, wherein both the first angle θ1 and the second angle θ1 are preferably between 10° and 55° (shown in the embodiment of FIG. 4A). The adjustment of the second angle θ2 will correspondingly alter the energy distribution of light that exits from the light-exiting surface 112 and further increase the brightness and the uniformity of light. Smaller first angle θ1 will correspondingly reduce the energy of light at the viewing angle around −80° (the viewing angle herein is from the normal to the light-exiting surface 112) and also improve the uniformity of light.

Figure 2C:
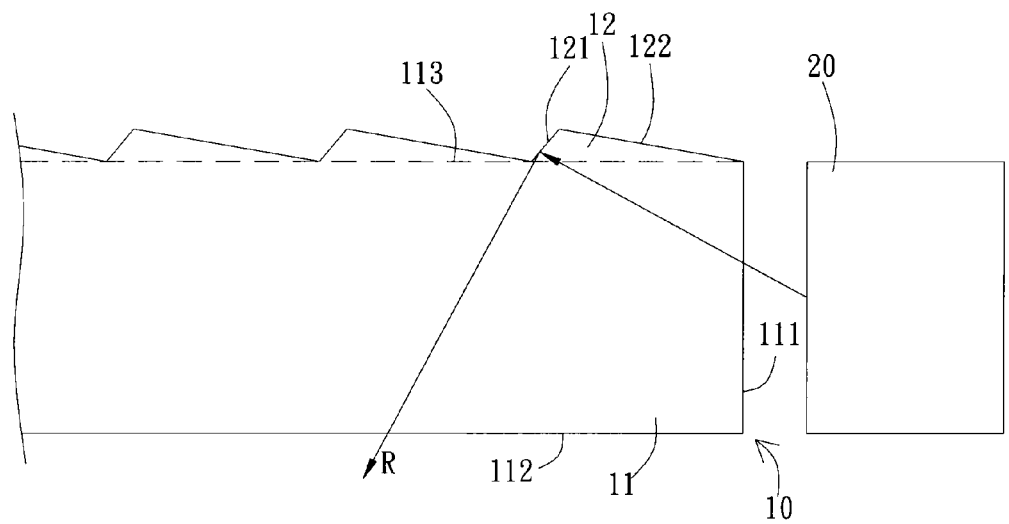
FIG. 2C is a schematic view that the prisms reflect light of the light guide bar of FIG. 2B.
Figure 2D:
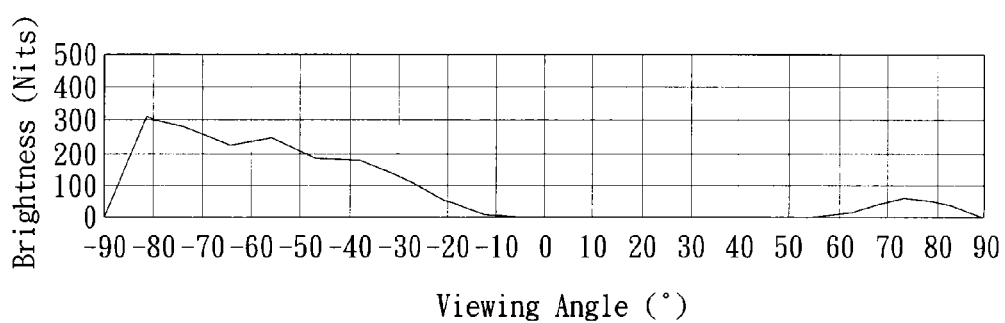
FIG. 2D is a schematic view of the brightness performance of the light guide bar of FIG. 2B.

FIG. 2C is a schematic view showing the light reflected at the prism of the light guide bar of FIG. 2B. As shown in FIG. 2C, the light R generated by the light source 20 enters the light guide bar 10 from the first receiving end 111 and is then reflected by the first surface 121 of the prism 12 to exit from the light-exiting surface 112. The first surface 121 facilitates to direct the light R, so that the light R can exit from the light-exiting surface 112 with nearly vertical angle to increase the brightness of the light R that exits from the light-exiting surface 112. Besides, the uniformity of light is improved by disposing different prisms 12 on different positions of the structure surface 113. For example, prisms 12 having different first angle θ1 and second angle θ2 can be adopted to adjust the energy of the light R exiting from different position of the light-exiting surface 112. FIG. 2D is a schematic view of the brightness performance of the light guide bar shown in FIG. 2B. As shown in FIG. 2D, the design of the light guide bar 10 can make the light energy (or the brightness) be uniformly distributed between the viewing angle 0° and −80°.

Utilizing the design of the prisms 12 can adjust the exit angle of light from the bar body 11 to increase the brightness and the uniformity of the light, further improving the touch-sensing effect of the optical touch panel utilizing the light guide bar 10.

Figure 2E:
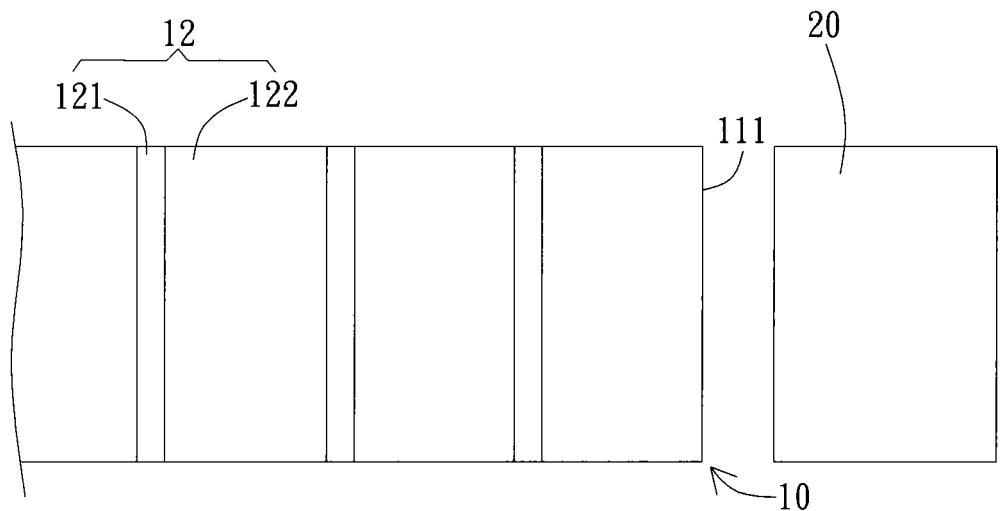
FIG. 2E is a side view of the light guide bar of FIG. 2B.
Figure 3A:
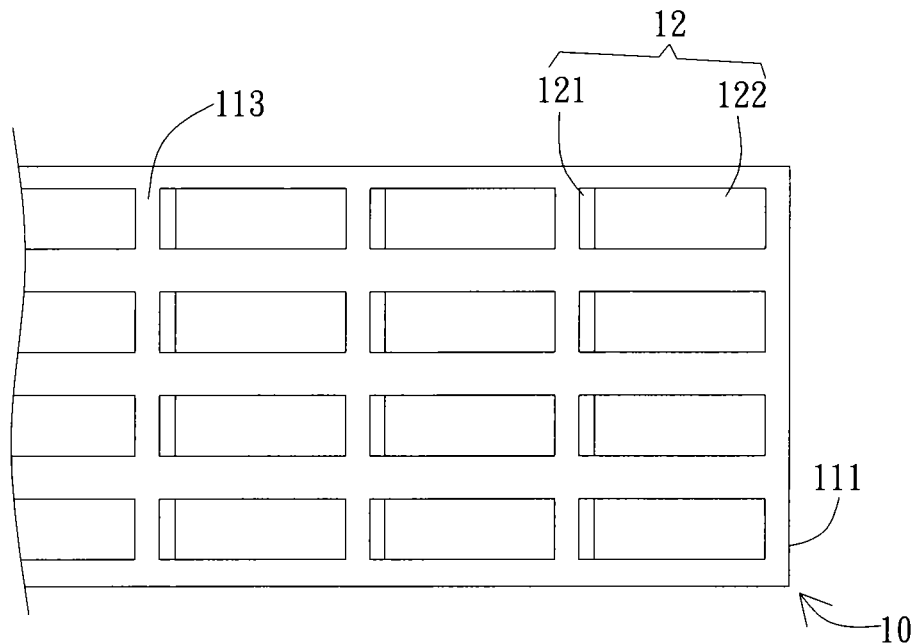
FIG. 3A is a schematic view of an embodiment of the prisms of the light guide bar of the present invention.
Figure 3B:
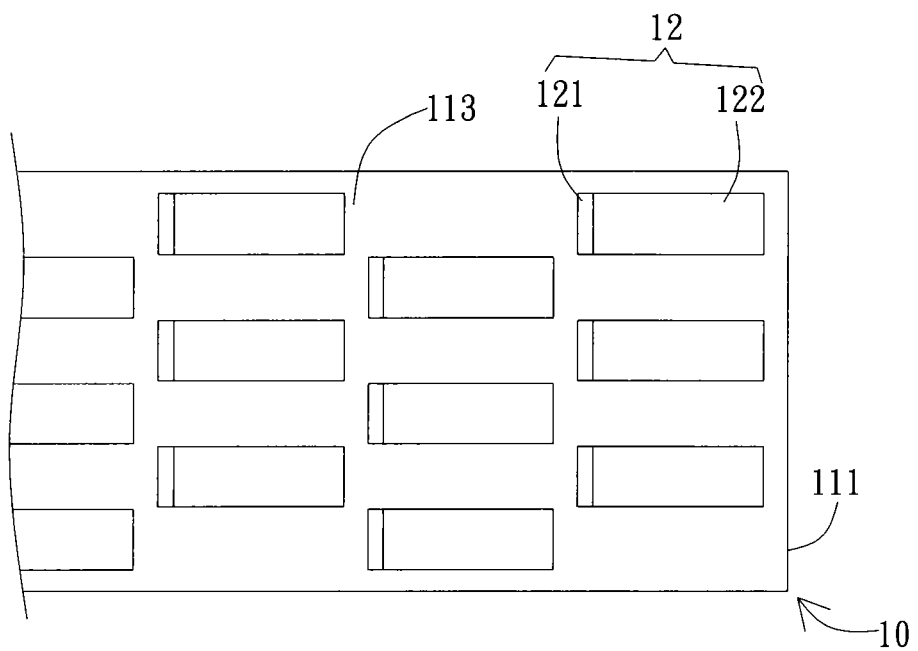
FIG. 3B is a schematic view of another embodiment of the prisms of the light guide bar of FIG. 3A.

FIG. 2E is a side view of the light guide bar shown in FIG. 2B. As shown in FIG. 2E, the prism 12 has a strip shape and is disposed along the shorter side of the bar body 11 on the structure surface 113. The prisms 12 are disposed side by side along the longer side of the bar body 11 on the structure surface 113. In other embodiments, however, the prisms 12 can be disposed in other manners. FIG. 3A is a schematic view of another embodiment of the prisms of the light guide bar. As shown in FIG. 3A, the prisms 12 are short prisms in pellet shape, wherein the prisms 12 are linearly disposed along directions parallel and perpendicular to the first receiving end 111, and each prism 12 keeps the same space with the neighbor prism 12. Besides, the side of each prism 12 faces the side of the neighbor prism 12, so that the prisms 12 are arranged in a checkerboard-like distribution. FIG. 3B is a schematic view of a variant arrangement of the prisms of the light guide bar of FIG. 3A in another embodiment. As shown in FIG. 3B, the difference between the disposition of the prisms 12 in FIG. 3B and the disposition of the prisms 12 in FIG. 3A is that the side of each prism 12 does not face the side of the neighbor prism 12 so that the prisms are arranged in an interlaced manner.

Figure 3C:
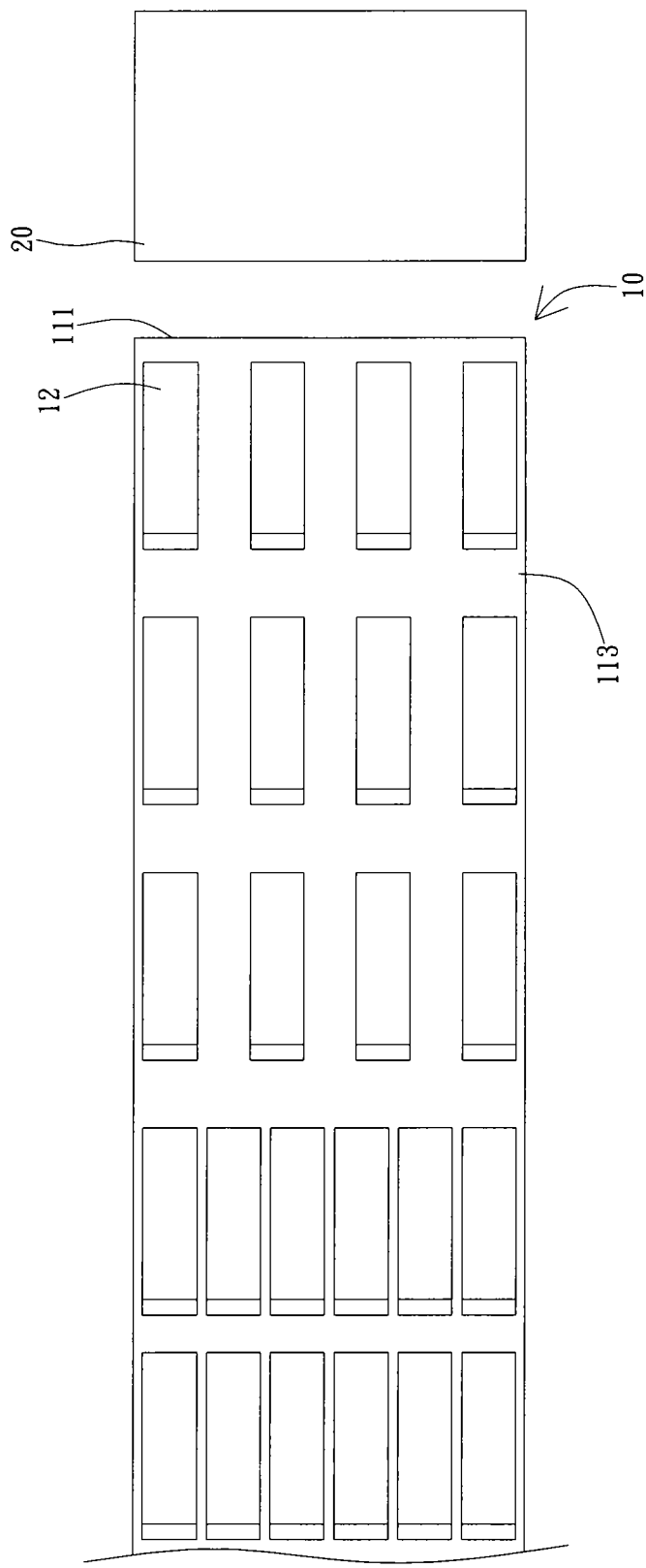
FIG. 3C is a schematic view of further another embodiment of the prisms of the light guide bar of FIG. 3A.

Besides, in other embodiments, the prisms 12 on different positions of the structure surface 113 can be disposed with different spacing, so that the distribution of light exiting from the light-exiting surface 112 can be adjusted. As shown in FIG. 3C, the prisms 12 near the first receiving end 111 are disposed less dense (i.e. larger spacing, lower distribution density), and the prisms 12 away from the first receiving end 111 are disposed more dense (i.e. smaller spacing, higher distribution density). Because the light generated from the light source 20 enters the light guide bar 10 from the first receiving end 111, the smaller the effect of the concentrated energy closer to the first receiving end 111 is, contrarily the bigger the effect of the concentrated energy farther from the first receiving end 111 is. This arrangement facilitates to improve the brightness and the uniformity of light exiting from the light-exiting surface 112.

Figure 4A:
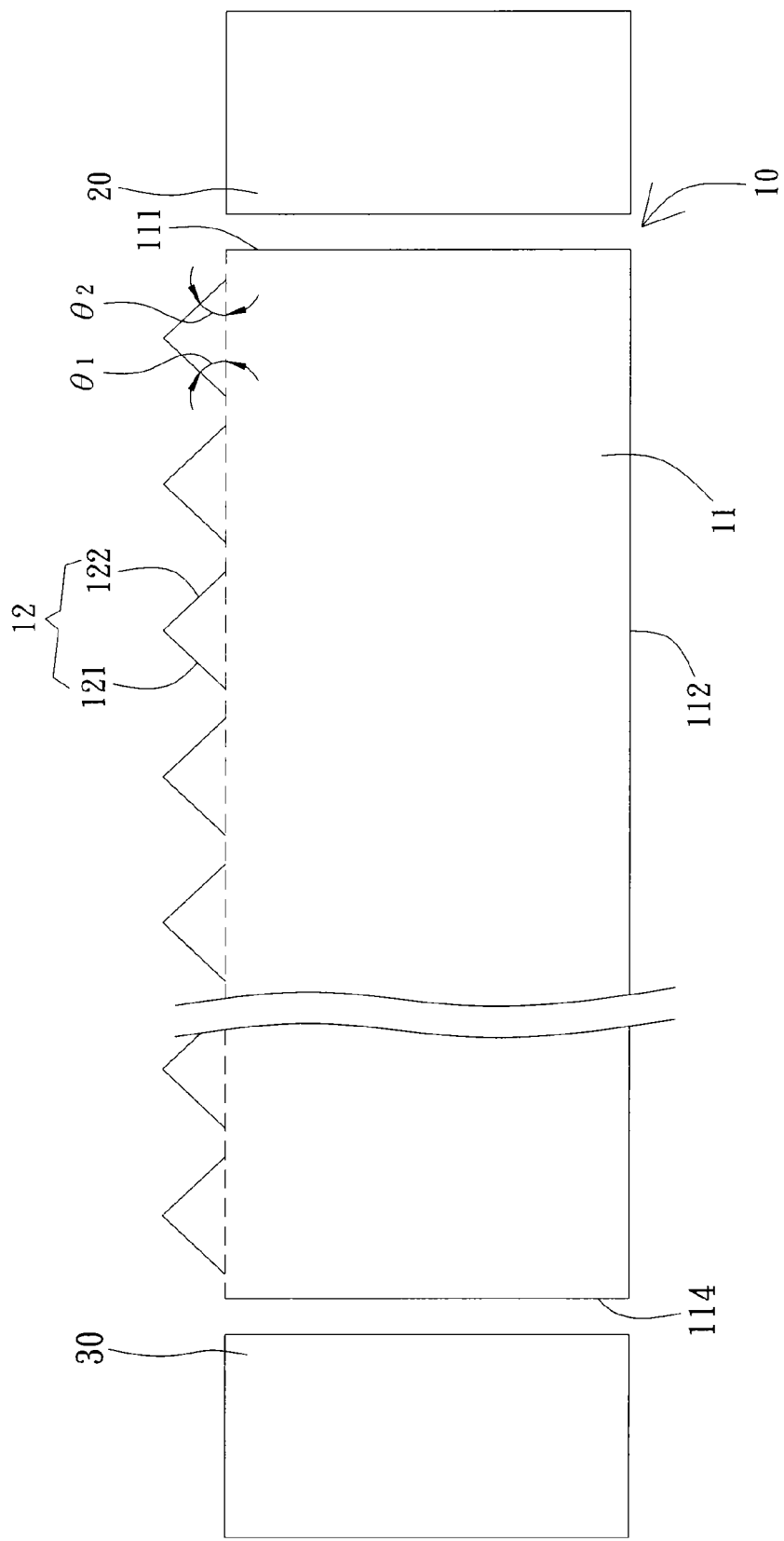
FIG. 4A is a top view of another embodiment of the light guide bar of the present invention.
Figure 4B:
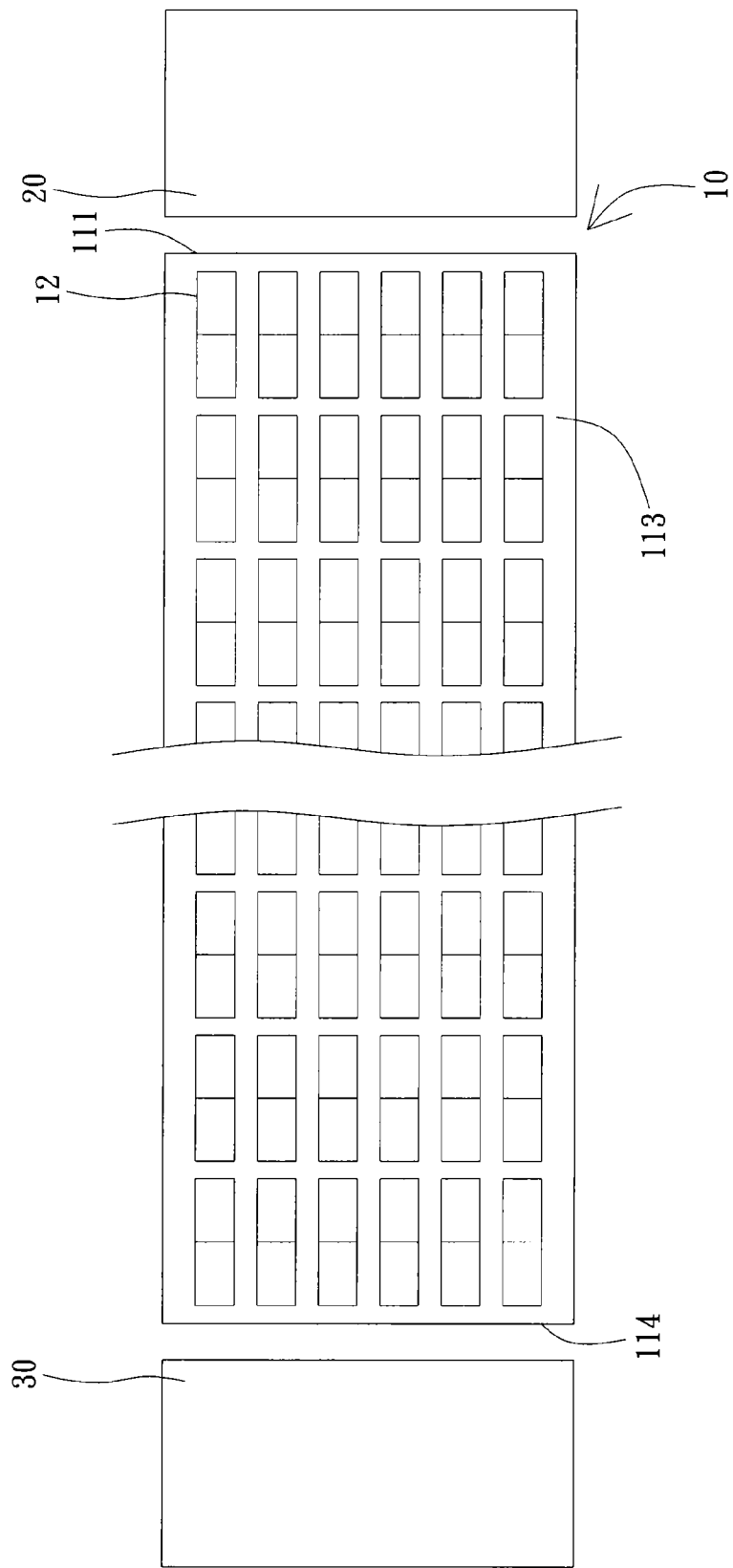
FIG. 4B is a side view of the light guide bar of FIG. 4A.
Figure 5A:
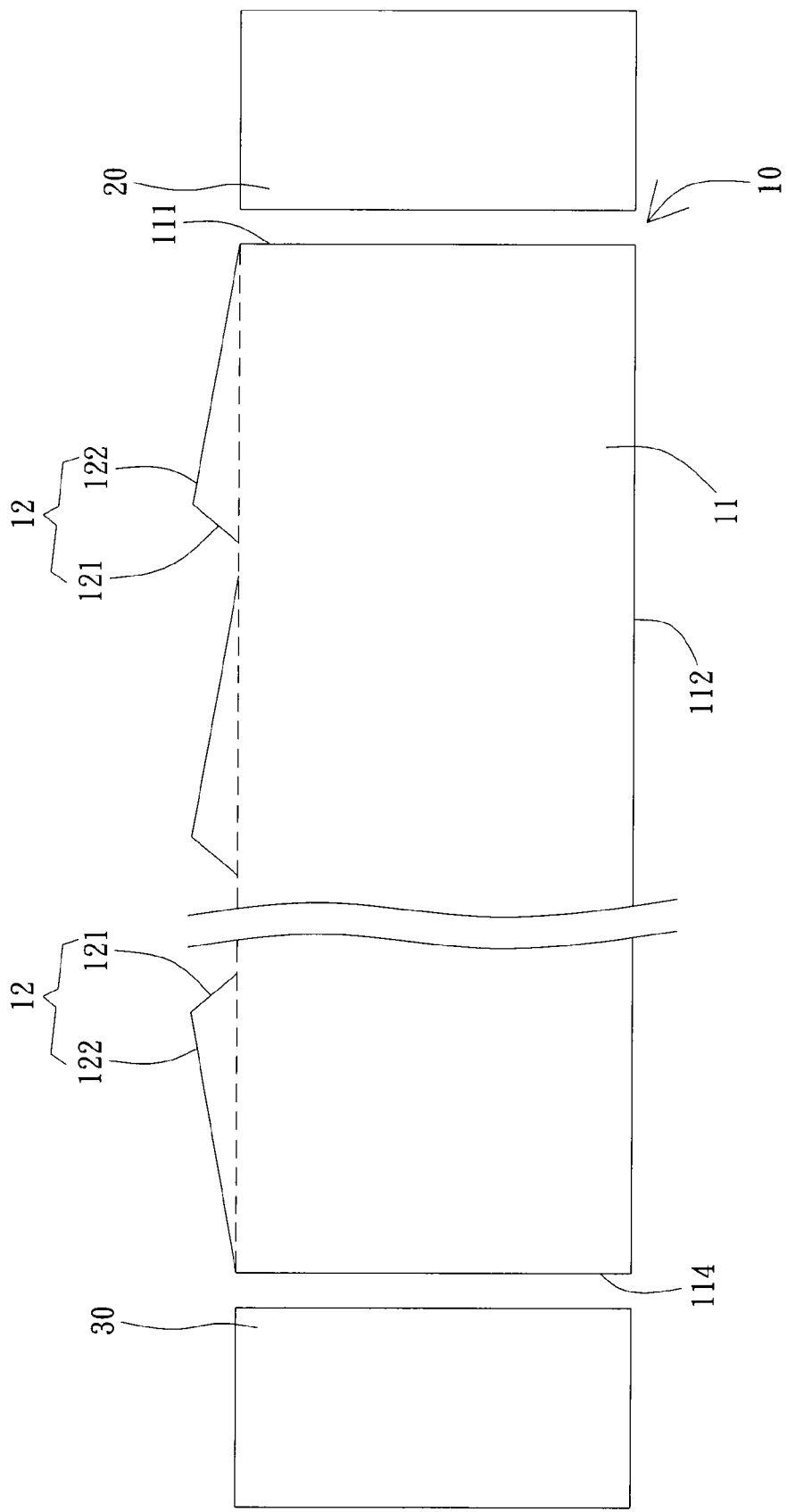
FIG. 5A is a top view of another embodiment of the light guide bar of the present invention.
Figure 5B:
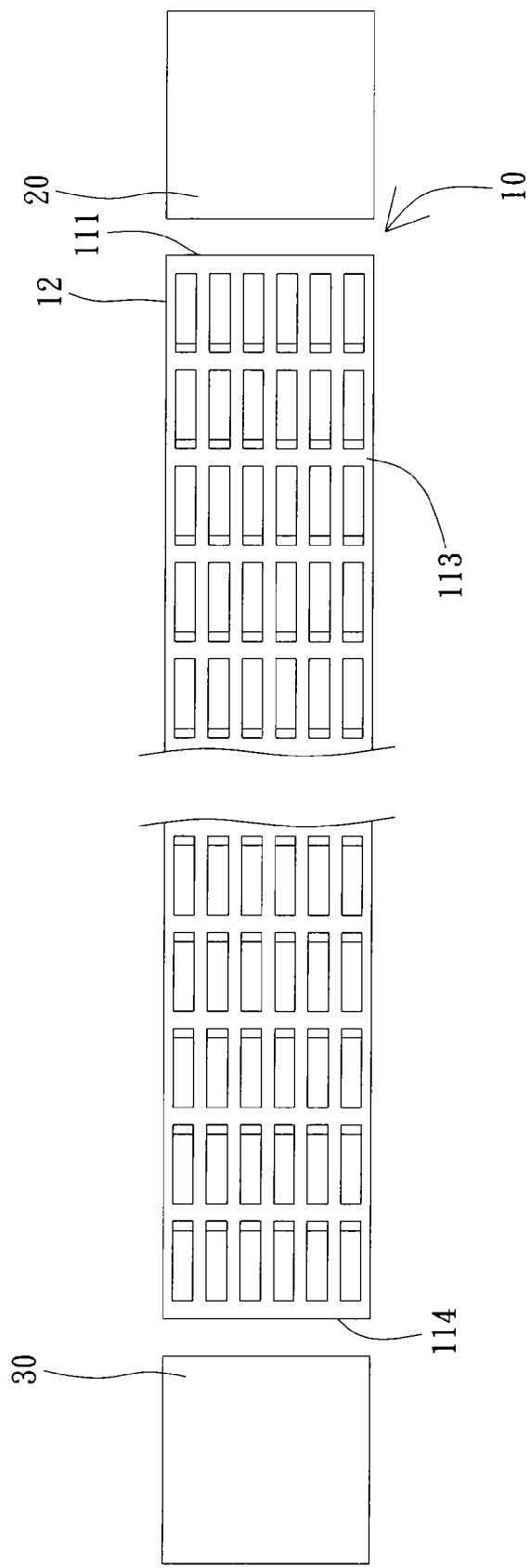
FIG. 5B is a side view of the light guide bar of FIG. 5A.

FIG. 4A is a top view of another embodiment of the light guide bar of the present invention; FIG. 4B is a side view of the light guide bar shown in FIG. 4A. As shown in FIG. 4A and FIG. 4B, in the embodiment, the bar body 11 includes a second receiving end 114 and a second light source 30, wherein the second receiving end 114 is opposite to the first receiving end 111, and light generated from the second light source 30 enters the light guide bar 10 from the second receiving end 114. In the embodiment, the first angle θ1 is equal to the second angle θ2, and both the first angle θ1 and the second angle θ2 are preferably between 10° and 55°. In other embodiments, however, the first angle θ1 can be different from the second angle θ2. FIG. 5A is a top view of further another embodiment of the light guide bar of the present invention; FIG. 5B is a side view of the light guide bar shown in FIG. 5A. As shown in FIG. 5A and FIG. 5B, in the embodiment, the first angle θ1 is different from the second angle θ2, wherein the first angle θ1 is preferably between 10° and 55°, and the second angle θ2 is preferably between 3° and 10°.

Figure 6A:
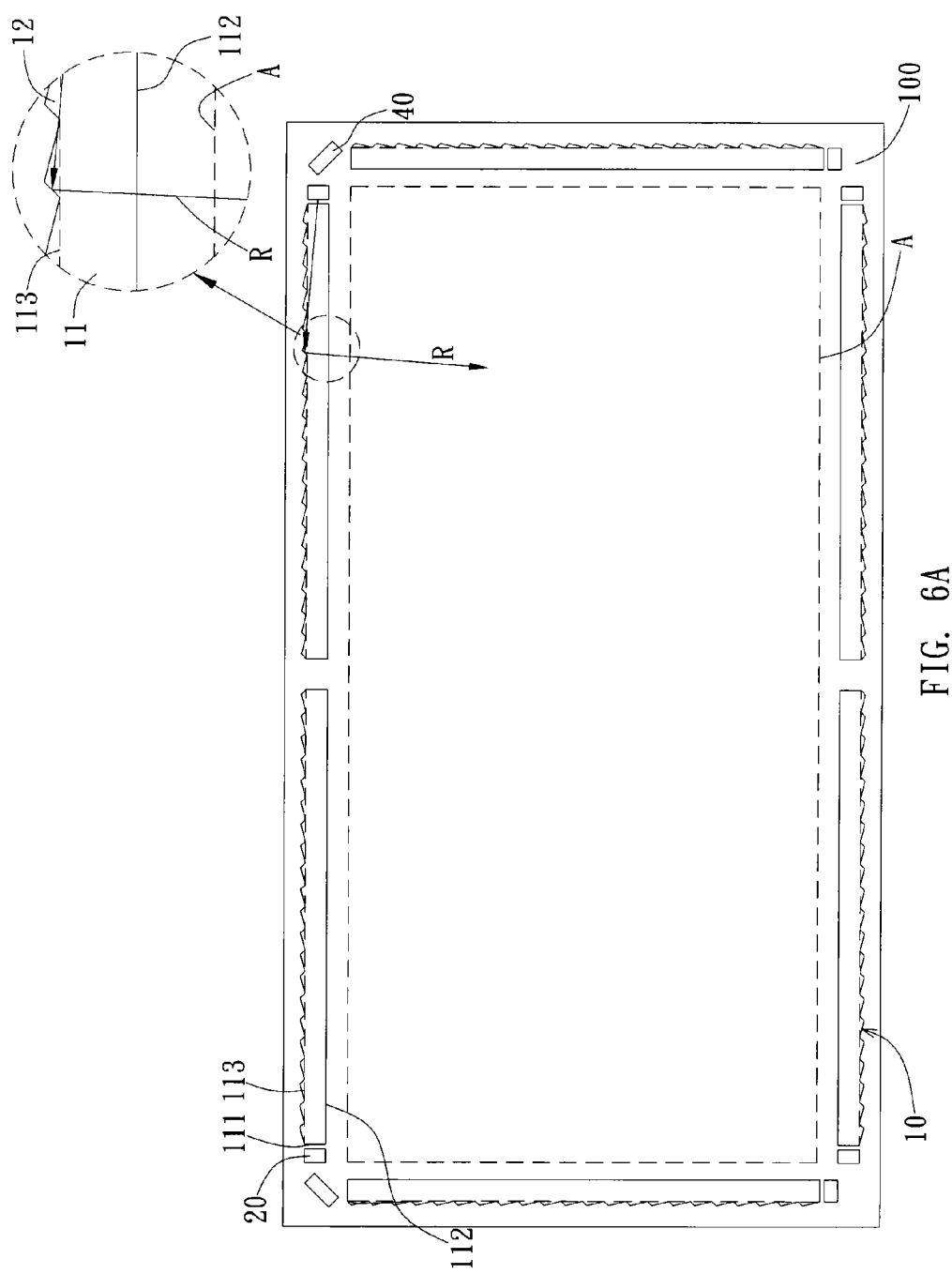
FIG. 6A is a schematic view of an embodiment of the optical touch panel of the present invention.

FIG. 6A is a schematic view of an embodiment of the optical touch panel of the present invention. As shown in FIG. 6A, the optical touch panel includes a sensing area A, a light guide bar 10, a light source 20, and a sensor 40. The light guide bar 10 includes a bar body 11 and a plurality of prisms 12. The bar body 11 has a first receiving end 111, a light-exiting surface 112, and a structure surface 113. The light-exiting surface 112 faces the sensing area A and is opposite to the structure surface 113. The first receiving end 111 is connected between the end of the light-exiting surface 112 and the end of the structure surface 113. In a preferred embodiment, as described above, the first surface 121 and the second surface 122 of each prism 12 respectively have a first angle θ1 and a second angle θ2 with respect to the structure surface 113, wherein the first angle θ1 and the second angle θ2 are different (shown in the embodiment of FIG. 2B). In other embodiments, however, the first surface 121 and the second surface 122 respectively have a first angle θ1 and a second angle θ2 with respect to the structure surface 113, wherein the first angle θ1 and the second angle θ2 are the same (shown in the embodiment of FIG. 4A).

The light R generated from the light source 20 enters the light guide bar 10 from the first receiving end 111, and is then reflected by the prism 12 to exit from the light-exiting surface 112 and enter the sensing area A. The light guide bar 10, the light source 20, and the sensor 40 are disposed on a substrate 100. In a preferred embodiment, the light source 20 is an infrared light-emitting diode (LED), and the substrate 100 is a flat display panel. In other embodiments, however, the light source 20 can be other type of the light-emitting components, and the substrate 100 can be a simply transparent substrate, a substrate on a display panel, or other substrate for supporting components such as the light guide bar 10. The light generated from the light source 20 is guided to the sensing area A through the light guide bar 10, and then the sensor 40 senses the light in the sensing area A. When a user touches the sensing area A, the sensor 40 senses the variance of the energy in the sensing area A and further determines the touch coordinates.

Figure 6B:
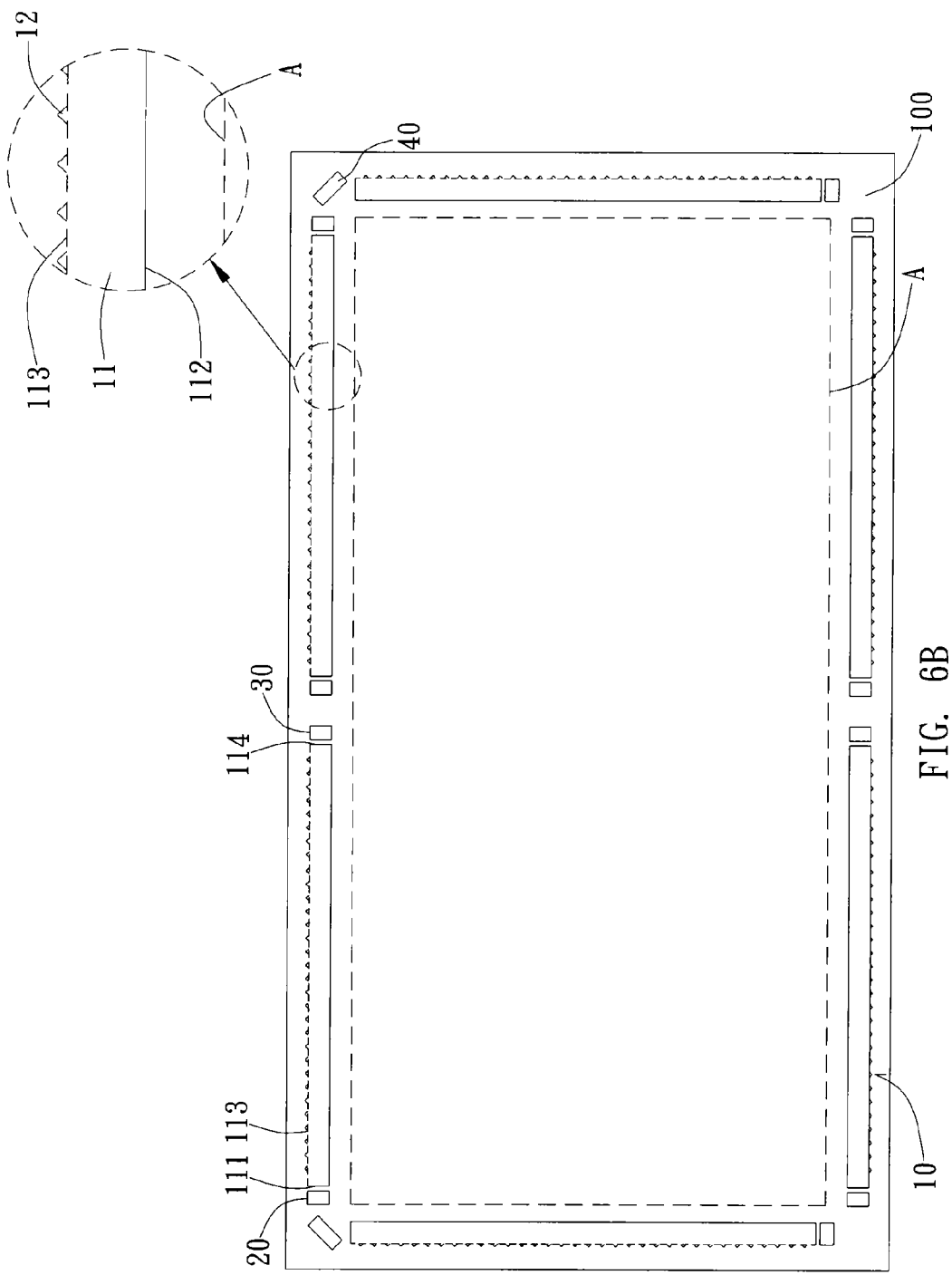
FIG. 6B is a schematic view of another embodiment of the optical touch panel of the present invention.

FIG. 6B is a schematic view of another embodiment of the optical touch panel of the present invention. As shown in FIG. 6B, the optical touch panel includes not only a sensing area A, a light guide bar 10, a light source 20, and a sensor 40, but also a second light source 30. The bar body 11 includes a second receiving end 114 opposite to the first receiving end 111. The light generated from the second light source 30 enters the light guide bar 10 from the second receiving end 114. In a preferred embodiment, the first angle θ1 is equal to the second angle θ2 (shown in the embodiment of FIG. 4A); in other embodiments, however, the two angles can be different (shown in the embodiment in FIG. 2B).

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. A light guide bar for use in an optical touch panel having a sensing area, comprising:
a bar body having a first receiving end, a light-exiting surface, and a structure surface, wherein the light-exiting surface is opposite to the structure surface and faces the sensing area, the first receiving end is connected between an end of the light-exiting surface and an end of the structure surface; and
a plurality of prisms formed on the structure surface and respectively disposed along a first direction parallel to the first receiving end and along a second direction perpendicular to the direction of the first receiving end, wherein the plurality of prisms are arranged in intervals or in an interlaced manner along the first direction and along the second direction, each prism comprising a first surface and a second surface respectively having a first angle and a second angle with respect to the structure surface, wherein the second surface is closer to the light receiving end than the first surface, and the first angle is larger than or equal to the second angle.

2. The light guide bar of claim 1, wherein the prisms have a smaller distribution density near the first receiving end.

3. The light guide bar of claim 1, wherein the first angle is between 10° and 55°.

4. The light guide bar of claim 3, wherein the second angle is between 3° and 10°.

5. The light guide bar of claim 3, wherein the bar body comprises a second receiving end opposite to the first receiving end, wherein the first angle is equal to the second angle.

6. The light guide bar of claim 1, wherein the second angle is between 10° and 55°.

7. An optical touch panel, comprising:
a sensing area;
a light guide bar, comprising:
a bar body having a first receiving end, a light-exiting surface, and a structure surface, wherein the light-exiting surface is opposite to the structure surface and faces the sensing area, the first receiving end is connected between an end of the light-exiting surface and an end of the structure surface;
a plurality of prisms formed on the structure surface and respectively disposed along a first direction parallel to the first receiving end and along a second direction perpendicular to the direction of the first receiving end, wherein the plurality of prisms are arranged in intervals or in an interlaced manner along the first direction and along the second direction, each prism comprising a first surface and a second surface respectively having a first angle and a second angle with respect to the structure surface, wherein the second surface is closer to the light receiving end than the first surface, and the first angle is larger than or equal to the second angle; and
a light source disposed opposite to the first receiving end of the bar body, wherein light generated from the light source enters the bar body and reflected by the first surface to exit from the light-exiting surface.

8. The optical touch panel of the claim 7, wherein the prisms have a smaller distribution density near the first receiving end.

9. The optical touch panel of claim 7, wherein the first angle is between 10° and 55°.

10. The optical touch panel of claim 9, wherein the second angle is between 3° and 10°.

11. The optical touch panel of claim 9, further comprising a second light source, wherein the bar body comprises a second receiving end opposite to the first receiving end, wherein the first angle is equal to the second angle.

12. The optical touch panel of claim 7, wherein the second angle is between 10° and 55°.

\* \* \* \* \*